US011652896B1

(12) United States Patent
Podder et al.

(10) Patent No.: US 11,652,896 B1
(45) Date of Patent: May 16, 2023

(54) LOCATION AWARE LEARNING SYSTEM FOR CONTENT DISPENSATION FOR RESOURCE-CONSTRAINED EDGE DEVICES

(71) Applicant: Accenture Global Solutions Limited, Dublin (IE)

(72) Inventors: Sanjay Podder, Thane (IN); Nataraj Kuntagod, Bangalore (IN); Venkatesh Subramanian, Bangalore (IN); Satya Sai Srinivas, Bangalore (IN); Yogesh Mallaiah, Bengaluru (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/744,325

(22) Filed: May 13, 2022

(30) Foreign Application Priority Data

Dec. 22, 2021 (IN) .............................. 202141059903

(51) Int. Cl.
*H04L 67/51* (2022.01)
(52) U.S. Cl.
CPC ................................... *H04L 67/51* (2022.05)

(58) Field of Classification Search
None
See application file for complete search history.

(56) References Cited

U.S. PATENT DOCUMENTS

| 9,923,951 | B2* | 3/2018 | Dimov ................ H04L 65/1094 |
| 11,172,415 | B2* | 11/2021 | Bhumkar ............ H04W 12/062 |
| 2016/0286457 | A1* | 9/2016 | O'hare .................. H04W 24/02 |

* cited by examiner

*Primary Examiner* — Lance Leonard Barry
(74) *Attorney, Agent, or Firm* — Crowell & Moring LLP (57) ABSTRACT

A learning system for automatically transmitting files according to user capabilities is provided. The learning system may include non-transitory memory storing instructions executable to transmit a file to a user device, and a processor circuitry configured to execute the instructions to determine a home base location of a user from at least one of a database storing user information of the user and the user device of the user. The processor circuitry further configured to calculate a travel distance from the home base location of the user to a hub circuitry of the learning system, determine a type of the file and an amount of content of the file based on the travel distance, and transmit, to the user device, the file according to the type of the file and the amount of content of the file.

19 Claims, 8 Drawing Sheets

| Storage 802 | Distance 804 | Learning Rate 806 | Content (Chapters) 808 | Video % 810 | Audio % 812 | Transcript % 814 |
|---|---|---|---|---|---|---|
| Good | Far | Fast | 4 | 20% | 60% | 20% |
| Good | Far | Slow | 2 | 50% | 40% | 10% |
| Good | Near | Fast | 2 | 50% | 40% | 10% |
| Good | Near | Slow | 1 | 80% | 10% | 10% |
| Poor | Far | Fast | 2 | 20% | 60% | 20% |
| Poor | Far | Slow | 1 | 50% | 40% | 10% |
| Poor | Near | Fast | 1 | 50% | 40% | 10% |
| Poor | Near | Slow | 0.5 | 80% | 10% | 10% |

FIG. 8

LOCATION AWARE LEARNING SYSTEM FOR CONTENT DISPENSATION FOR RESOURCE-CONSTRAINED EDGE DEVICES

This application claims the benefit of priority to India Patent Application No. 202141059903, filed Dec. 22, 2021, and entitled LOCATION AWARE LEARNING SYSTEM FOR CONTENT DISPENSATION FOR RESOURCE-CONSTRAINED EDGE DEVICES, the entire contents of which are incorporated herein by reference.

TECHNICAL FIELD

The present disclosure relates to a learning system and more particularly to a location aware learning system for content dispensation for resource-constrained edge devices.

BACKGROUND

The statements in this section merely provide background information related to the present disclosure and may not constitute prior art.

On line learning with mobile user devices is increasing. As a large volume of content is being provided to user devices with different performance capabilities, adjusting a type and amount of content to the capabilities of user devices when delivering such contents may be desired.

SUMMARY

A learning system may be a location aware learning system for automatically transmitting files according to the capability of a user device. The learning system may include non-transitory memory storing instructions executable to transmit a file to a user device; and a processor circuitry configured to execute the instructions to determine a home base location of a user from the information, calculate a travel distance from the home base location of the user to a learning system hub circuitry, determine a type of the file and an amount of content of the file based on the travel distance, and transmit, to the user device, the file according to the type of the file and the amount of content of the file.

In some forms of the present disclosure, when the type of the file and the amount of content the file are determined, the processor circuitry may be configured to determine the type of the file and the amount of content of the file based on a storage capacity of the user device, the home base location of the user, and a learning capacity of the user.

When the information is received, the processor circuitry may be configured to determine a predetermined slice size according to a storage capacity of the user device, the travel distance from the user device to the learning system hub circuitry, and a learning capacity of a user.

The processor circuitry may be further configured to divide the information into a first slice, determine whether the first slice is greater than or equal to the predetermined slice size, when it is determined that the first slice is greater than or equal to the predetermined slice size, divide the first slice into a second slice, wherein the second slice includes a number of slices greater than the first slice, and convert the second slice into a combination of a video file, an audio file, and a text file.

In some forms of the present disclosure, the processor circuitry may be further configured to when it is determined that the first slice is less than the predetermined slice size, use the first slice to determine the type of the file and the amount of content of the file.

The processor circuitry may be further configured to determine whether the travel distance is greater than or equal to a predetermined value that is specific to each user, when it is determined that the travel distance is greater than or equal to the predetermined value, transmit, to an individual storage assigned to each user, the travel distance for recalculation, determine the type of the file and the amount of content of the file based on the recalculated travel distance, and transmit, to the user device, the file according to the type of the file and the amount of content of the file.

The processor circuitry may be further configured to when it is determined that the travel distance is less than the predetermined value, transmit, to the user device, the file according to the type of the file and the amount of content of the file.

In some forms of the present disclosure, when the type of the file and the amount of content of the file are determined, the processor circuitry may be configured to determine whether the storage capacity is greater than or equal to a first threshold value, when it is determined that the storage capacity is greater than or equal to the first threshold value, transmit, to the user device, a first file, and when it is determined that the storage capacity is less than the first threshold value, transmit, to the user device, a second file, wherein a size of the first file is greater than a size of the second file.

When the type of the file and the amount of content of the file are determined, the processor circuitry may be further configured to determine whether the travel distance is greater than or equal to a second threshold value, when it is determined that the travel distance is greater than or equal to the second threshold value, transmit, to the user device, a third file, and when it is determined that the travel distance is less than the second threshold value, transmit, to the user device, a fourth file, wherein a size of the third file is greater than a size of the fourth file.

When the type of the file and the amount of content of the file are determined, the processor circuitry may be further configured to determine whether the learning capacity is greater than or equal to a third threshold value, when it is determined that the learning capacity is greater than or equal to the third threshold value, transmit, to the user device, a fifth file, and when it is determined that the travel distance is less than the third threshold value, transmit, to the user device, a sixth file, wherein a size of the fifth file is greater than a size of the sixth file.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
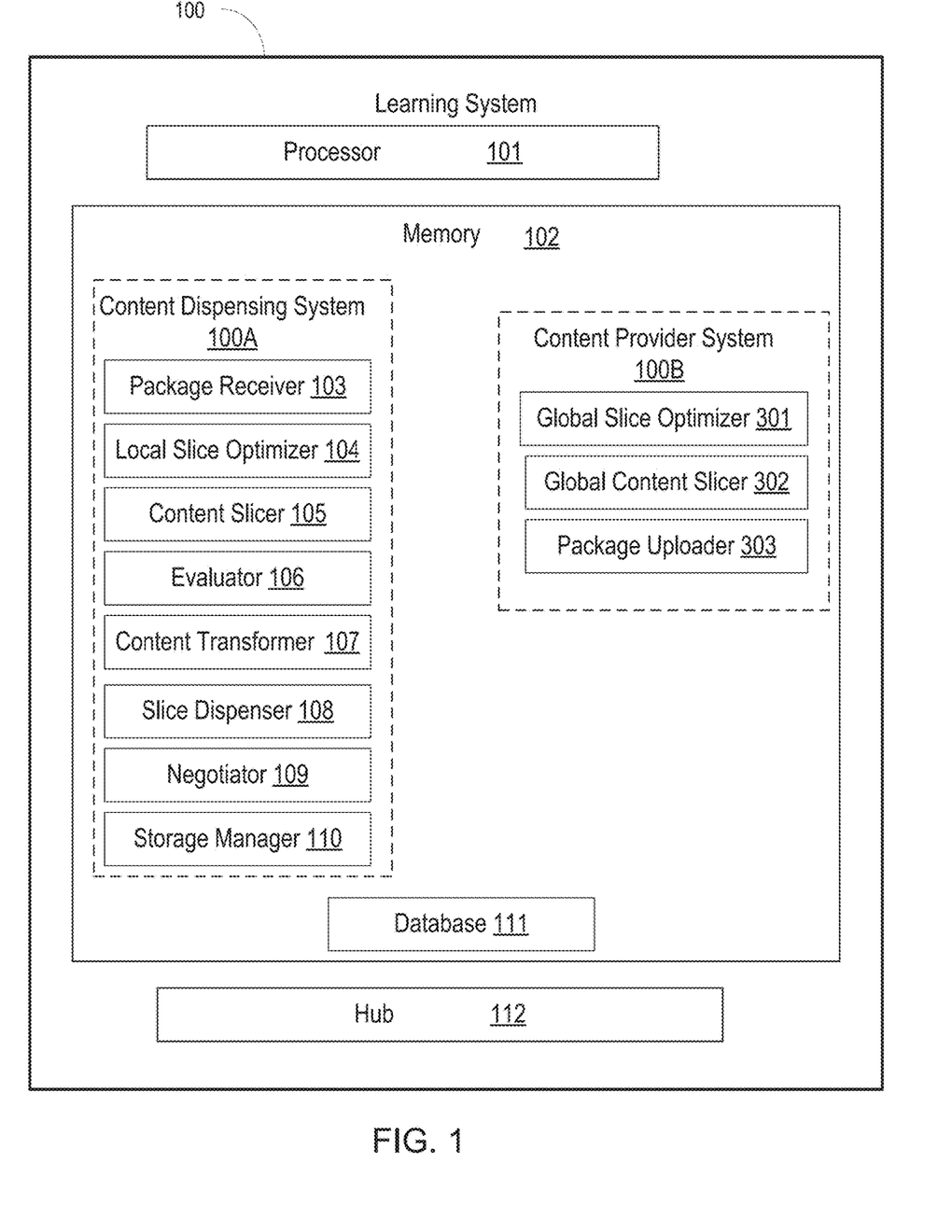
FIG. 1 illustrates an exemplary configuration of a learning system that includes a memory and a processor circuitry.

FIG. 1 illustrates an exemplary configuration of a learning system 100 that includes a processor circuitry 101 and a memory 102.

The processor circuitry 101 may be in communication with the memory 102. In one example, the processor circuitry 101 may also be in communication with additional elements such as a network interface. Examples of the processor circuitry 101 may include a general processor, a central processing unit, a microcontroller, a server, a hub circuitry, an application specific integrated circuit (ASIC), a digital signal processor, a field programmable gate array (FPGA), and/or a digital circuit, analog circuit, or some combination thereof.

The processor circuitry 101 may be one or more devices operable to execute logic. The logic may include computer executable instructions, machine readable instructions, or computer code stored in the memory 102 or in other memory that when executed by the processor circuitry 101, cause the processor circuitry 101 to perform the features implemented by the logic of a package receiver 103, a local slice optimizer 104, a content slicer 105, an evaluator 106, a content transformer 107, a slice dispenser 108, a negotiator 109, a storage manager 110, and/or the learning system 100. The computer code may include instructions executable with the processor circuitry 101.

The memory 102 may be any non-transitory device for storing and retrieving data or any combination thereof. The memory 102 may include non-volatile and/or volatile memory, such as a random access memory (RAM), a read-only memory (ROM), an erasable programmable read-only memory (EPROM), or flash memory. Alternatively or in addition, the memory 102 may include an optical, magnetic (hard-device) or any other form of data storage device.

The memory 102 may include a content dispensing system 100A and a content provider system 1008. The content dispensing system 100A may include at least a part of a package receiver 103, a local slice optimizer 104, a content slicer 105, an evaluator 106, a content transformer 107, a slice dispenser 108, a negotiator 109, a storage manager 110, and/or other components of the learning system 100 described herein. The content provider system 100B may include a global slice optimizer 301, a content slicer 302 and a package uploader 303, and/or other components of the learning system 100 described herein.

The learning system 100 may also include a database 111 and a hub circuitry 112. The database 111 may be any form of one or more data storage containers stored in the memory 102. The database 111 may be a relational database and/or a sequence database managed and controlled by the learning system 100 in a database system such as, for example, a hierarchical database system, a network database system or an object-oriented database system. The database 111 may be distributed, centralized, or some combination of distributed and centralized and may be controlled, maintained and accessed by the learning system 100.

The hub circuitry 112 may provide, for example, wireless communication for the learning system 100. For example, the hub circuitry 112 may be a wireless router in communication with user devices that come within communication range of the wireless router. The hub circuitry 112 may perform handshaking, identification, authentication and otherwise configure a communication channel between the learning system 100 and user devices. The learning system 100 may communicate with user devices, for example, via the network interface and the hub circuitry 112. Since the hub circuitry 112 has a relatively limited communication range, the user devices must be physically moved within the communication range of the hub circuitry 112 before communication may be established.

Figure 2:
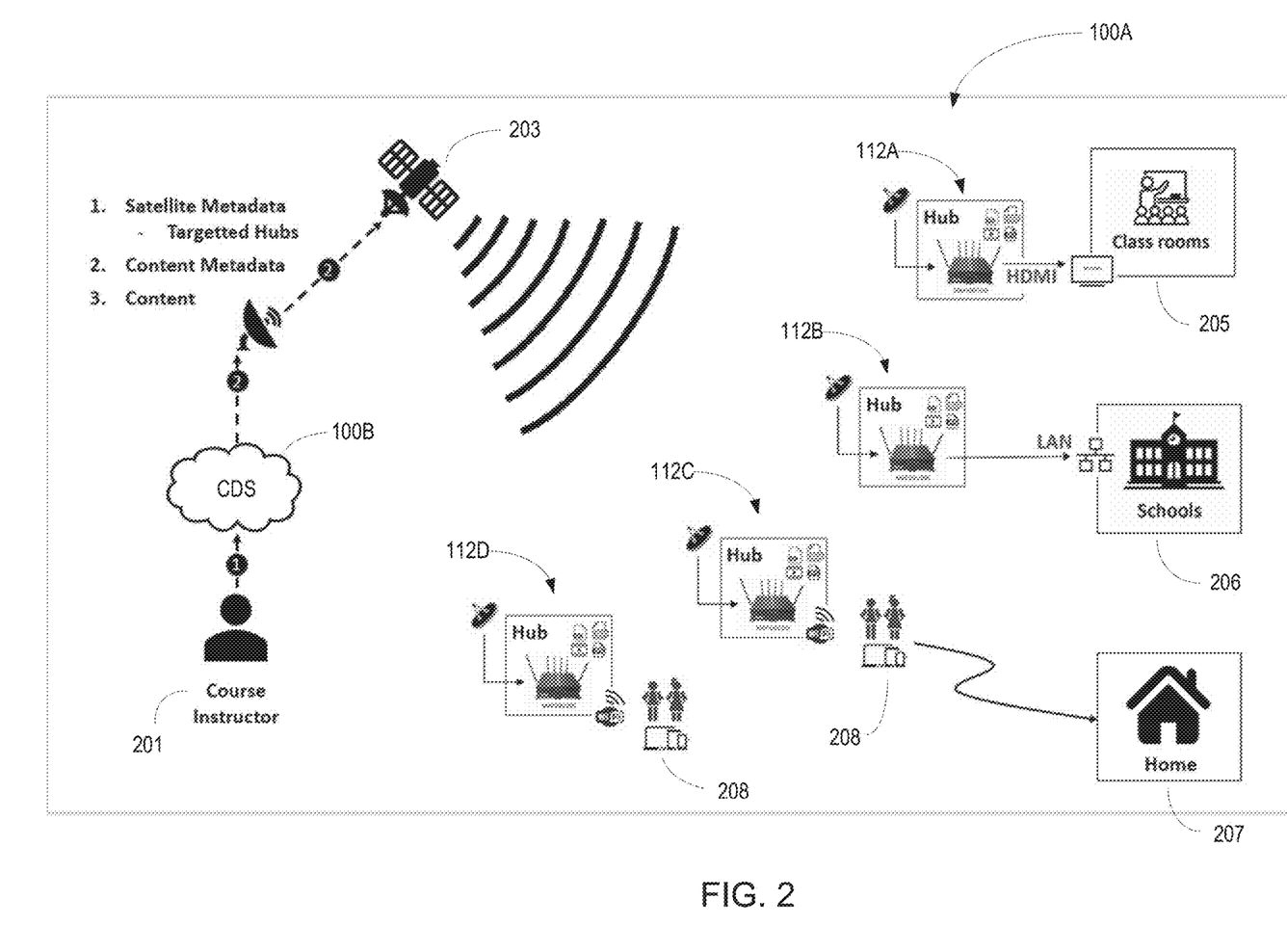
FIG. 2 illustrates the operation of content distribution.

FIG. 2 illustrates an example operation of content distribution with the learning system 100. In FIG. 2, a content provider 201 may upload a content to the content provider system 100B (CPS). The content provider system 100B may then provide the content to a satellite communication 203, cloud, server, or any type of network. The content may then be distributed by the content dispensing system 100A to different hub circuitry 112. In other examples, content distribution may occur in other ways.

At each hub circuitry 112, the content may be distributed to each user in different formats. For example, the content may be transmitted to classrooms 205 using an HDMI cable via the hub 112A. In another example, the same content may be delivered to schools 206 using a LAN cable via the hub circuitry 112B. Alternatively, each user may download or stream the content using a user device 208 via a wireless connection to the hub circuitry 112C or 112D. Some users may download the content onto the user device 208 from the hub circuitry 112C and take the user device 208 home 207 to watch the content at their leisure. Some users may download the content onto the user device 208 from the hub circuitry 112D and watch/interact with the content while still maintaining the wireless connection with the hub 112D. In some examples, the content dispensing system 100A may deliver the content without taking the storage capability of the user device 208 and network connectivity into consideration. Rather, the content dispensing circuitry 100A may distribute the content consistently regardless of the status of the user device 208, such as by ignoring when a group of users have user devices 208 with limited storage and processing power. Under these circumstances, different techniques for content delivery to the user device 208 may be used, such as downgrading bandwidth, reducing frame rate, and dynamic compression.

Referring to FIGS. 1 and 2, in examples the learning system 100 may calculate a travel distance from a home base location of the user to a geographic location where the user device 208 enters into communication range of the hub circuitry 112. The home base location may be, for example, where the user lives, which may not be in the same town, or part of town where the hub circuitry 112 is geographically located and therefore is out of range of communication with the hub circuitry 112. The home base of the user may, for example, be stored as user specific information in the database 111 along with other information stored for each of the users and/or user devices. In addition, the learning system 100 may determine a type of a file and an amount of content of the file provided by the system to a user device 208 based on the travel distance, and transmit, to the user device 208 via the hub circuitry 112, the file according to the type of the file and the amount of content of the file.

As described herein the type of the file may be a video file, an audio file, a text file or some combination of a video file, an audio file and a text file. In addition, the amount of content as described herein refers to a volume or quantity of subject matter represented by the file(s) being transmitted as slices to a user device. The content of the file may be from an external information provider. For example, an external information provider may provide educational materials in the form of chapters in a book, where the amount of content represents a quantity or number of the chapters being provided.

Figure 3:
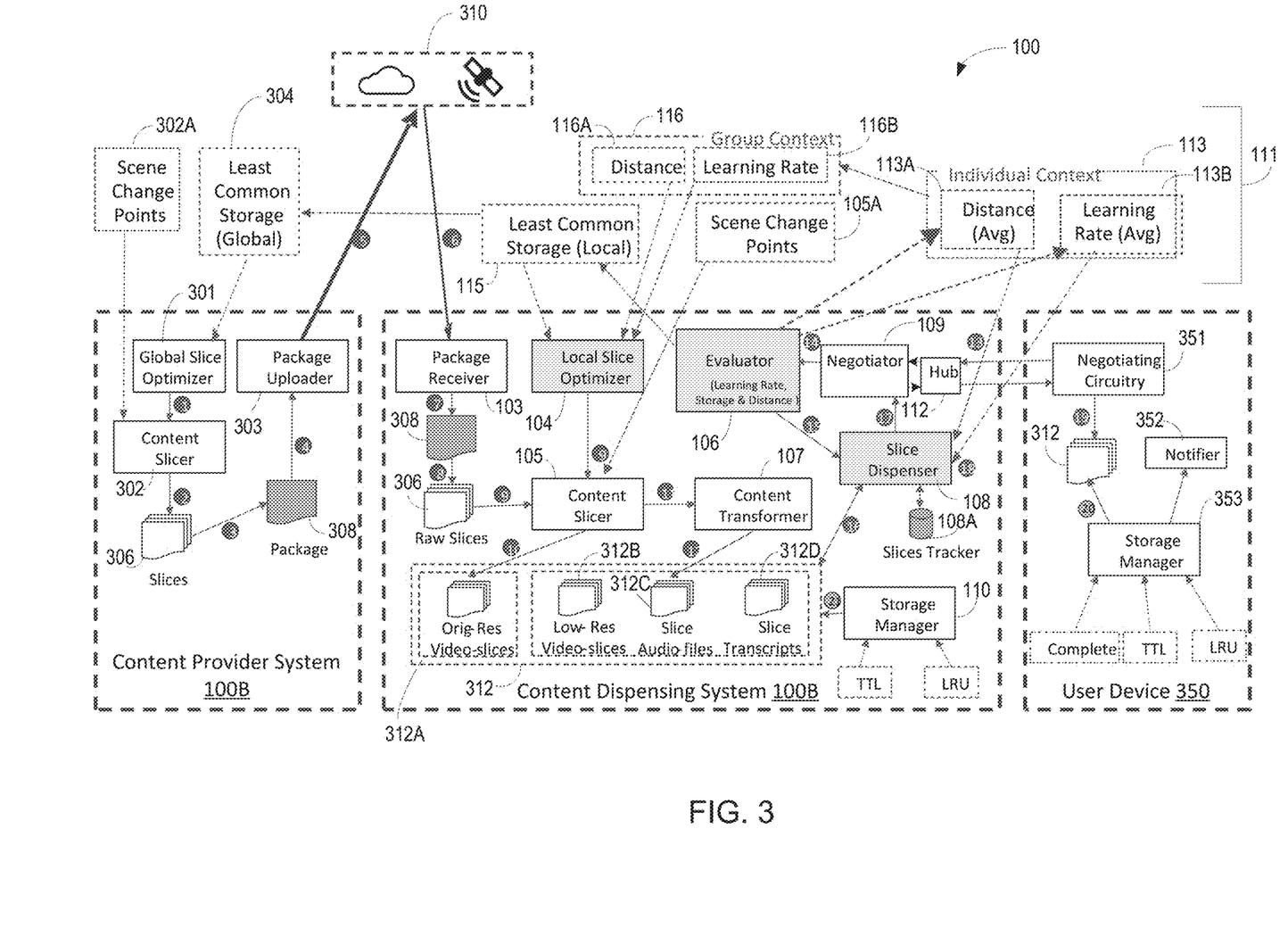
FIG. 3 illustrates an exemplary configuration of an external information provider, the learning system, and a user device.
Figure 4:
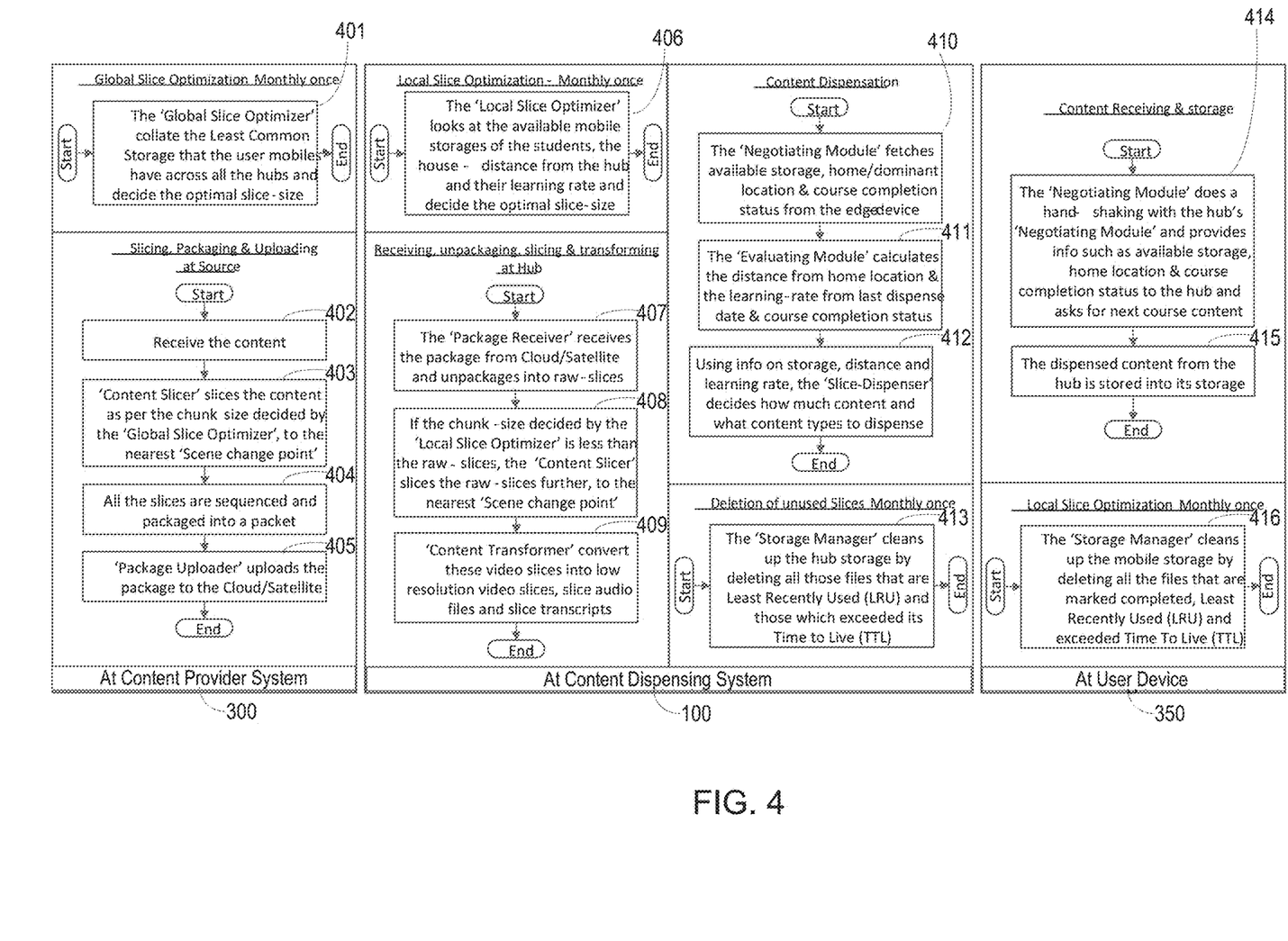
FIG. 4 provides a flow chart of how the external information provider, the learning system, and the user device communicate with each other.

FIG. 3 illustrates an exemplary configuration of the learning system 100, which includes the content dispensing system 100A, the content providing system 100B, and a user device 350. In addition, FIG. 4 provides an example of a step-by-step explanation of how the learning system 100, and the user device 350 may communicate with each other.

The content provider system 100B may include a one or more processor circuitries which cause the processor circuitry(s) to perform the features implemented by the logic of the global slice optimizer 301, the content slicer 302 (or global content slicer 302), and the package uploader 303.

The global slice optimizer 301 may decide a desirable chunk-size that would be suitable for most of the users across the learning system 100. For example, the chunk size may be based on the least common storage (global) 304 that may provide information representing an average memory and/or storage capacity of the user devices 350 across all the learning systems 100. As used herein, a "chunk size" refers to the size of the corresponding data file that is being generated as a slice. As used herein, a "slice" refers to a datafile that is generated to represent a divided-out portion of a larger data file having a lesser data file size. Thus, a larger data file may be divided or "sliced" by the system into a number of slices of relatively smaller data file sizes based on a predetermined criterion, such as rules and/or logic used by the system as discussed herein. An "amount of content" as used herein refers to a quantity of subject matter being represented in a file, in the form of slice(s).

The content slicer 302 may divide the information/content based on the chunk-size decided by the global slice optimizer 301 according to the least common storage (global) 304. The content slicer 302 may slice the relevant information/content to generate raw slices 306 which may be smaller file size. In the example of a continuous data datafile, the decision of how to divide up the continuous data datafile may be based on a determination by the content slicer 302 of scene change points. Scene change points may be points in the continuous datafile that may be breaks or pauses in the content of the continuous datafile, such as when there is a change of scene or limited visual change in a video datafile or a silence during a transition, such as between different speakers or a speaker inhaling, in an audio file.

The package uploader 303 may package the slices 306 that have been sliced by the content slicer 302 into a package 308. The package 308 containing the slices 306 may be uploaded into a network 306, such as a wireless network, cloud, or satellite communication network by the package uploader 303.

With reference to FIGS. 3 and 4, at the content provider system 100B, the following steps may be performed.

Step 401: The global slice optimizer 301 may collect the least common storage (global) 304 that the user devices 350 may have across all of the hub circuitry 112 and decide a desirable/optimal slice size. The least common storage may be a minimum memory storage capacity of a predetermined population size of the user devices, an average memory storage capacity, or another method used to determine that the majority of the user devices 350 in the learning system 100 will have memory capacity to receive and store the data files.

Steps 402-405: Once the information/content, such as video content, is received (402), the content slicer 302 may slice the information/content per the chunk-size determined by the global slice optimizer 301 to generate raw slices 306 (403) sized smaller than the chunk-size. Slicing of the information content in the case of continuous content, such as video or audio files, may be based on identification of scene change points by the content slicer 302 in the data content. The scene change points may be provided by a scene change points analyzer 302A based on, for example, analysis of the information/content according to predetermined rules. An example of a scene change points analyzer 302A that may identify scene cut detection and video splitting is PYSCENEDETECT. Then, all of the raw slices 306 may be sequenced and packaged into a slice package 308 (404). Finally, the package uploader 303 may upload the slice package 308 to a network 310, such as a cloud/satellite, local area network, wide area network, or any other type of network (405).

The learning system 100 may include the circuitry and logic of the package receiver 103, the local slice optimizer 104, the content slicer 105, the evaluator 106, the content transformer 107, the slice dispenser 108, the negotiator 109, the storage manager 110. In addition, the learning system 100 may include the circuitry and logic of the scene points change analyzer 302A and a scene points change analyzer 105A. In some examples, the scene points change analyzer 302A may be executed by the content provider system 100B to determine scene change points. Alternatively, or in addition, scene change points, such as those determined by the scene change points analyzer 302A, may be stored in the database 111 for access by the content provider system 100B and the content slicer 302. The database 111 of the learning system 100 may also include the least common storage (global) 304, an individual context 113, a least common storage (local) 115, and a group context 116.

At the learning system 100, the following steps may, for example, occur.

Step 406: the local slice optimizer 104 may further slice the information/content to fit the needs of a population of user devices 350 within the vicinity of the learning system 100. For example, the population of user devices 350 may be identified as those user devices 350 in wireless communication with the hub circuitry 112. The needs of the population of user devices 350 may be fitted based on data from the least common storage (local) 115 and the group context 116 stored in the database 111. The least common storage (local) 115 may include a dynamically stored determination of the average data storage capacity among the population of user devices 350 in communication with the hub circuitry 112 as determined by the evaluator 106. Memory storage data capacity of the individual user devices 350 and the average data storage capacity may be provided from the evaluator 106 and stored in the least common storage (local) 115. In addition, the average data storage capacity and/or the memory storage capacity of the individual user devices 350 may be provided to the least common storage (global) 304.

Data in the least common storage (global) 304 may be accessed by the content provider system 1008 for use by the global slice optimizer 301. The evaluator 106 may determine the storage capacity of user devices 350 based on stored information, interrogation, or some combination.

Group context 116 may include at least one of consideration of travel distances of users 116A, and a learning capacity/learning rate 116B of the users. The travel distances of users 116A provides physical travel distances from the hub circuitry 112 of the learning system 100 to the home base of the users, such as where the user lives. Determination, by the evaluator 106 of the travel distances in a group context may be based on geographic locations analysis, collection of geographic information from respective user devices 350, historical information and/or stored information to provide a travel profile of the users who travel to come within the wireless communication range of the hub circuitry 112. Based on the travel profile, a group context travel distance of a group of users may be dynamically determined and stored in the database 111 in the distance 116A. Learning rate 116B in a group context may be a group context learning rate dynamically determined by the evaluator 106 based on the aptitude of the individual users to absorb learning materials. The group context 116 may be developed by the evaluator 106 from an individual context 113, and may be used in operation of the system 100, such as, for example, to prioritize those who are traveling from further away, and/or to allocate transmission bandwidth of data during time of heavy usage by users.

The individual context 113 may be unique for each user. In examples, the individual context may include individual data storage assigned to a user where the user average travel distance 113A and average learning rate 113B of the individual user may be stored in the database 111. The least common storage (Global) 304, least common storage local 115, group context 116, and individual context 113 may be controlled and managed by the learning system 100 via the evaluator 106. The group context 116 may provide storage of group information representative of groups of users, such as average learning capability and average travel distance of groups of users. In addition, the individual context 113 may provide each of the users with a unique individual storage area where their user specific information, such as individual learning capability and travel distance of the respective individual user is stored. Accordingly, each user of the learning system 100 may have a unique individual storage area assigned for their individual information within the individual context 113.

The local slice optimizer 104 may consider available storage of the user device provided by the least common storage (local) 115 and the group context 116 when further slicing information/content into smaller sizes. For example, the local slice optimizer 104, as part of the group context 116, may take into consideration an average physical travel distance from the hub circuitry 112 of the learning system 100 to the home base of a group of users, or community of users, who visit the hub circuitry 112, and/or the average learning capacity of the group of users. The average learning capacity may be an average of the learning capacity of the individual users in the group of users who visit the hub circuitry 112. The learning capacity of an individual user may be determined based on, for example a log of time to completion, a tally of correct answers, or any other criteria providing evidence of a level of understanding and speed of accurate uptake of new material. Based on these factors, the local slice optimizer 104 may decide a desirable/optimal slice size for delivery to the group of the user devices 350 presently in close enough vicinity for wireless communication with the hub circuitry 112 to receive the slices.

Step 407: the package receiver 103 may receive a packet from the cloud/satellite or any other type of network 310 and unpack the package 308, and extract from the package 308 the slices as raw slices 306.

Step 408: the content slicer 105 may slice the raw slices 306 further into smaller user slices 312 of different types when the chunk-size determined by the local slice optimizer 104 is less than the raw slices 306. For example, the content slicer 105 may slice a video file of raw slices 306 into smaller user slices 312, where each of the user slices 312 are original resolution video slices 312A. The determination of how to slice the raw slices 306 may be based on scene change points provided by the scene change point analyzer 105A. The scene change point analyzer 105A may identify scene changes points, such as pauses or changes in the flow of video or audio data files received as raw slices 306. In addition, or alternatively, the scene change points analyzer 105A may obtain scene changes from the scene change points analyzer 302A or a storage location having knowledge of scene changes in the data files such as the database 111. Scene change points obtained or determined by the scene change point analyzer 105A may be stored for future use in the database 111.

Step 409: In other examples, the content transformer 107 may convert, for example, a raw slice 306 of a video file into other types of user slices 312 which are smaller than original resolution video slices 312A, such as lower resolution video files 312B, audio files 312C, and/or text files 312D.

Step 410: the negotiator 109 may provide available storage, user home base location, and content completion status from the user device 350. User related information may be stored in the database 111 associated with a respective unique user ID, extracted from stored information on the respective user devices 350, received from polling of respective user devices 350 in communication with the hub circuitry 112 and/or entered by a user of a respective user device 350.

Step 411: the evaluator 106 may calculate the travel distance from the user home base location and the learning capacity of the user from the most up-to-date data and the status of content completion. In doing so, the evaluator 106 may consider the actual travel distance of each of the user devices 350 to the hub circuitry 112 of the learning system 100, and the learning capacity of individual users. The travel distance, may be a geographic distance over which a user must travel such that the user's mobile device 350 is brought into range of the wireless signal from the hub circuitry 112 and can communicate with the hub circuitry 112.

Step 412: the slice dispenser 108 may determine a type and an amount of the file(s)/content to transmit to a user device 350 using data from the individual context 113. Accordingly, the slice dispenser 108 may perform a logic-based slice factor analysis involving the storage capacity of the user device 350 provided by the evaluator 106 and data from the individual context 113. The individual context 113 may include a travel distance 113A of an individual, which may be an average travel distance based on multiple trips between the user's home base with the user device 350 to the hub circuitry 112 of the learning system 100. In addition, the individual context 113 may include a learning rate 113B of the individual user, which may represent the learning capacity of the individual user based on the user's performance as discussed elsewhere. The learning rate 113B of the individual user may be broken down by subject matter area such that the slice dispenser 108 may consider subject matter of the materials as an additional slice factor for the size/complexity of the user slices 312.

Depending upon the slice factors, the slice dispenser 108 may generate a weighting used to decide the type of the file/content of the user slices 312, such as, for example, a full resolution full video file 312A, a full video file with low resolution 3128, a video file along with embedded audio files 312A or 3128, a video file along with embedded transcript/text files 312A or 312B, a full audio file 312C, an audio file along with embedded transcript/text files 312C and 312D, or a full transcript/text file 312D. A slices tracker 108A may store the size of slices provided, slice factors, weightings and/or other decision criteria in the database 111 in association with the user device and/or the user for later use during future slice size determinations, weighting, and user slice type determinations.

Step 413: the storage manager 110 may manage storage in the database 111 and re-use of the different types of file/content user slices 312 to avoid the need to slice and transform data each time the same raw slices 306 are received or for users with similar individual context 113. In addition, the storage manager 110 may manage the storage in the database 111 of the user slices 312 of the learning system 100. The storage manager 110 may include a time to live counter (TTL) 110A and a least recently used (LRU) counter 1108. The store manager 110 may, for example, delete from the database 111 at least some of the files which are user slices 312 that it determines are least recently used (LRU) and those files that have exceeded their time to live (TTL) according to a predetermined time schedule, threshold values, space remaining in the database 111 for storage of user slices 312, or some other criteria. Criteria for LRU and TTL may be based on predetermined criteria, or may be dynamically determined according to the activity level of the system 100.

The user device 350 may include the circuitry and logic of a negotiating circuitry 351, a notifier 352, and a resource manager 353.

At the user device 350, the following steps may be performed.

At 414: the negotiating circuitry 351 may understand what has been transmitted by the learning system 100 and store the user slices 312 as files into each relevant file system. Types of user slices 312 may include, for example, video files 312A and 312B, audio files 312C, and transcript/text files 312D. The negotiating circuitry 351 may communicate with the negotiator 109 at the learning system 100 and provide information for the individual user such as the available storage capacity of the user device 350, the travel distance from the user device 350 to be within wireless range of the hub circuitry 112 of the learning system 100, and the learning capacity of the user. Based on this information, the negotiating circuitry 351 may ask for the next available files/contents from the slice dispenser 108. In addition, the individual user information may be provided by the negotiator 109 to the evaluator 106 for storage in the individual context 113, the group context 116, the least common storage local 115 and the least common storage global 304.

At 415: the transferred files (user slices 312) from the learning system 100 may be stored by the resource manager 353.

At 416: Similar to the step 413, the resource manager 353 may manage and maintain the storage of the user device 350 (housekeeping). For example, the resource manager 353 may reject transmission and storage of files (user slices 312) that are already stored and/or delete those files that are least recently used (LRU) and/or files that exceeded their time to live (TTL) on an as-needed or a predetermined schedule, or both, basis. In addition, the resource manager 353 may monitor the completion status of an education module the user is working on, and eliminate those user slices 312 associated with the respective education module upon completion. In this regard, the resource manager 353 may include a complete counter 353A, a time to live (TTL) counter 353B and a least recently used (LRU) counter 353C. The resource manager 353 may also monitor available storage of the user device 350 and may adjust the criteria dynamically for deleting user slices 312 according to current storage needs of the user device 350.

Once sufficient storage is made available by the resource manager 353, the notifier 353 may send notifications to the user view a user interface, such as a graphical user interface, that sufficient storage is available for the user to move into range of communication with the hub circuitry 112 and download the next education module, such as a set of chapters/content.

Figure 5:
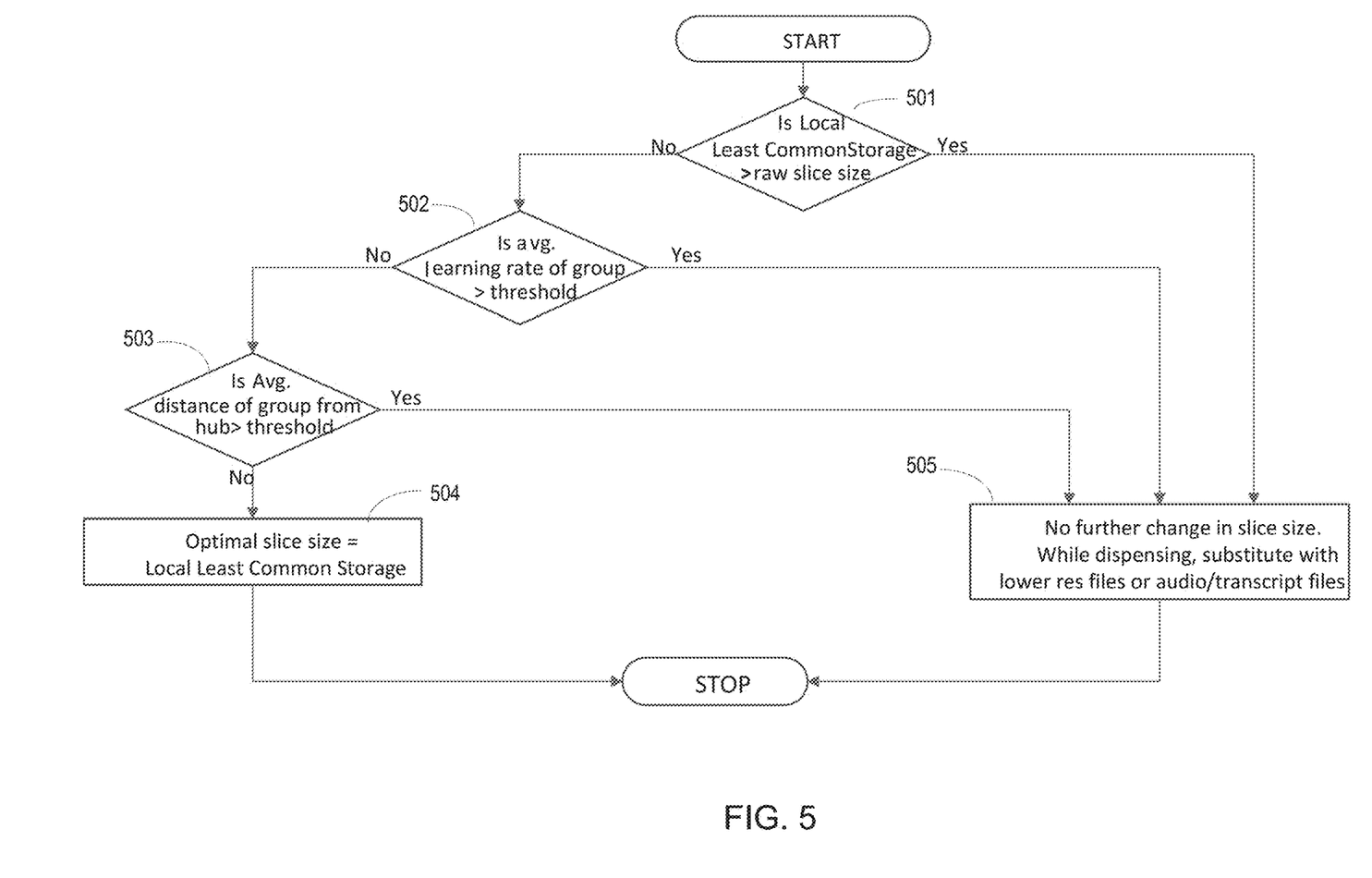
FIG. 5 illustrates a flow chart of an example of operation of the local slice optimizer at the learning system.

FIG. 5 illustrates a flow chart of an example of the operation of the local slice optimizer 104 at the learning system 100.

Step 501: the local slice optimizer 104 may determine whether the average data storage capacity among the population of user devices 350 in communication with the hub circuitry 112 dynamically stored in the least common storage (local) 115 is greater than the size of one more raw slices 306. If no, move to Step 502. If yes, move to Step 505 where no further change in slice size is necessary.

Step 502: if the local slice optimizer 104 determines that the average data storage capacity stored in the least common storage (local) 115 is less than the size of the one or more raw slices 306, then the local slice optimizer 104 may also use the group context 116 to determine whether an average learning capacity of the group of users (based on the group context learning rate 1168) in communication with the hub circuitry 112 is greater than a threshold value. If yes, then move to Step 505 and make no changes to the one or more raw slices 306.

Step 503, if the local slice optimizer 104 determines that the average learning capacity of the group of users according to the group context learning rate 1168 is less than the threshold value, then the local slice optimizer 104 may further determine whether an average travel distance of the group of users (based on the group context distance 116A) from their home base to the learning systems 100 is greater than a threshold value. If yes, then move to Step 505.

Step 504: if the local slice optimizer 104 determines, according to the group context distance 116A in the group context 116, that the average travel distance of the group of users from the user's home base to the hub circuitry 112 of the learning system 100 is less than the threshold value, then the local slice optimizer 104 may determine that the desirable/optimal slice size is equivalent to the least common storage (local) 115.

Figure 6:
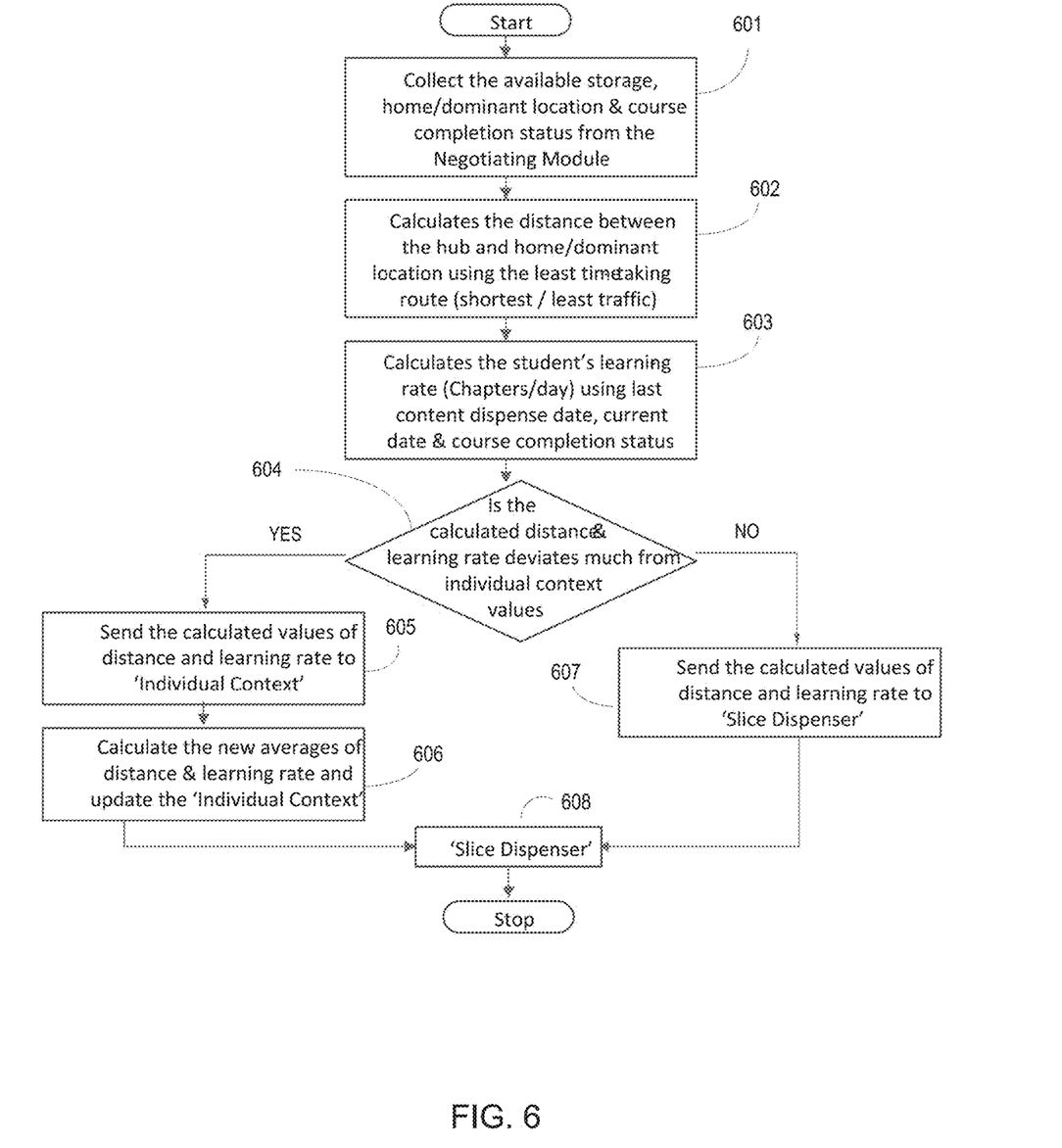
FIG. 6 illustrates a flow chart of an example of the operation of the evaluator circuitry at the learning system.

FIG. 6 illustrates a flow chart of example operation of the evaluator 106 at the learning system 100.

Step 601: the evaluator 106 may collect the available storage capacity of the respective user device 350, the home base location of the user, and an education module completion status of an individual user. The evaluator 106 may collect this information from the user device 350 and/or from the individual context 113. The home base location may be established based on, for example, the dominant location where the user's user device 350 is geographically positioned.

Step 602: the evaluator 106 may calculate the travel distance between the hub circuitry 112 of the learning system 100 and the home base location of the user device 350 using, for example, the least time-taking route. The least time-taking route may be the shortest route or the route with the least traffic at the time the user device commences communication with the hub circuitry 112.

Step 603: the evaluator 106 may then calculate the learning capacity of the user using the consumption date of the last file/content, current date, and the completion status of the file/content. In this way, the individual learning rate if the user may be calculated.

Step 604: the evaluator 106 may determine whether the calculated travel distance from 602 and the calculated learning capacity of the user from 603 differ from the stored distance (Avg) 113A and learning rate (Avg) 113B from the individual context 113 for the individual user. The level of deviation may be compared against a threshold, such as a percentage difference.

Step 605: if the answer to Step 604 is yes, then the evaluator 106 may send the calculated value of the travel distance and the learning capacity of the user to the individual context 113 for storage in the assigned storage of the respective user.

Step 606: the evaluator 106 may recalculate new averages of the travel distance and learning capacity, and update the individual context 113 accordingly by storing in the storage assigned to the respective user.

Step 607: if the answer to Step 604 is no, then the evaluator 106 may send the calculated values of the travel distance and learning capacity of the user to the slice dispenser 108.

Step 608: after the step 606 and 607, the slice dispenser 108 may take over and perform its tasks discussed above with reference to FIG. 5.

Figure 7:
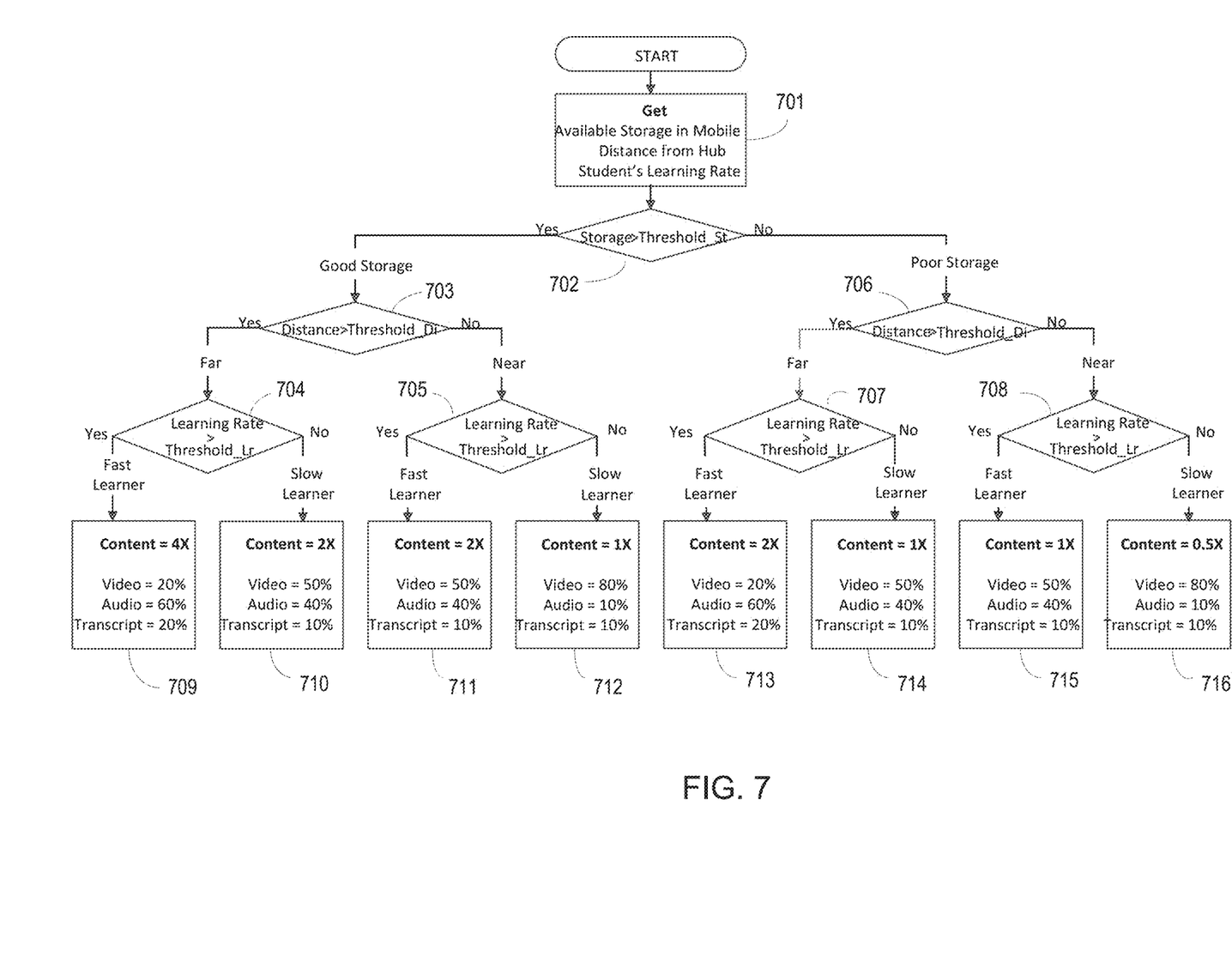
FIG. 7 illustrates a flow chart of an example of the distribution of files/contents according to certain factors.

FIG. 7 illustrates a flow chart of the distribution of files/contents according to certain factors.

Step 701: the slice dispenser 108 at the learning system 100 may obtain the storage capacity of the user device 350 and the individual context 113 by obtaining the travel distance (distance) from the user's home base to the hub circuitry 112 of the learning system 100, and the learning capacity (learning rate) of the user.

Step 702: the slice dispenser 108 may then determine whether the storage capacity of the user device 350 is greater than or equal to a first threshold value. If the storage capacity of the user device 350 is above the first threshold value, the user devices 350 is considered to have good storage capacity with the capability to store a relatively large volume of data. If, on the other hand, the user device 350 is below the first threshold value, the user device 350 has relatively low storage capacity and is considered to have relatively poor storage.

Step 703: if the answer to Step 702 is yes, then the slice dispenser 108 may determine whether the travel distance is greater than or equal to a second threshold value. The second threshold value may describe those user's who have traveled a far distant from their home base to reach wireless communication with the hub circuitry 112 vs. those user's who have traveled a short distance to from their home base to reach wireless communication with the hub circuitry 112.

Step 704: if the answer to Step 703 is yes (e.g. the user has traveled a relatively far distance to begin communication with the wireless hub 112), then the slice dispenser 108 may determine whether the learning capacity of the user is greater than or equal to a third threshold value. The third threshold value may be a predetermined value indicating users who are quickly grasping the material in an education module and therefore need a less in-depth tutorial to master the material, vs. those users who are relatively slower at mastering the materials and therefore need a more in depth experience, such as a more thorough explanation, more examples, and the like.

Step 705: if the answer to Step 703 is that the distance the user traveled does not exceed the threshold value (no), then the slice dispenser 108 may determine whether the learning capacity of the user is greater than or equal to a third threshold value.

Step 706: if the answer to Step 702 is that the storage capacity of the user device 350 does not exceed the predetermined threshold (no), then the slice dispenser 108 may determine whether the travel distance is greater than or equal to a second threshold value.

Step 707: if the answer to Step 706 is that the user has traveled greater than a predetermined distance (yes), then the slice dispenser 108 may determine whether the learning capacity of the user is greater than or equal to a third threshold value.

Step 708: if the answer to Step 706 is no, then the slice dispenser 108 may determine whether the learning capacity of the user is greater than or equal to a third threshold value.

Figure 8:
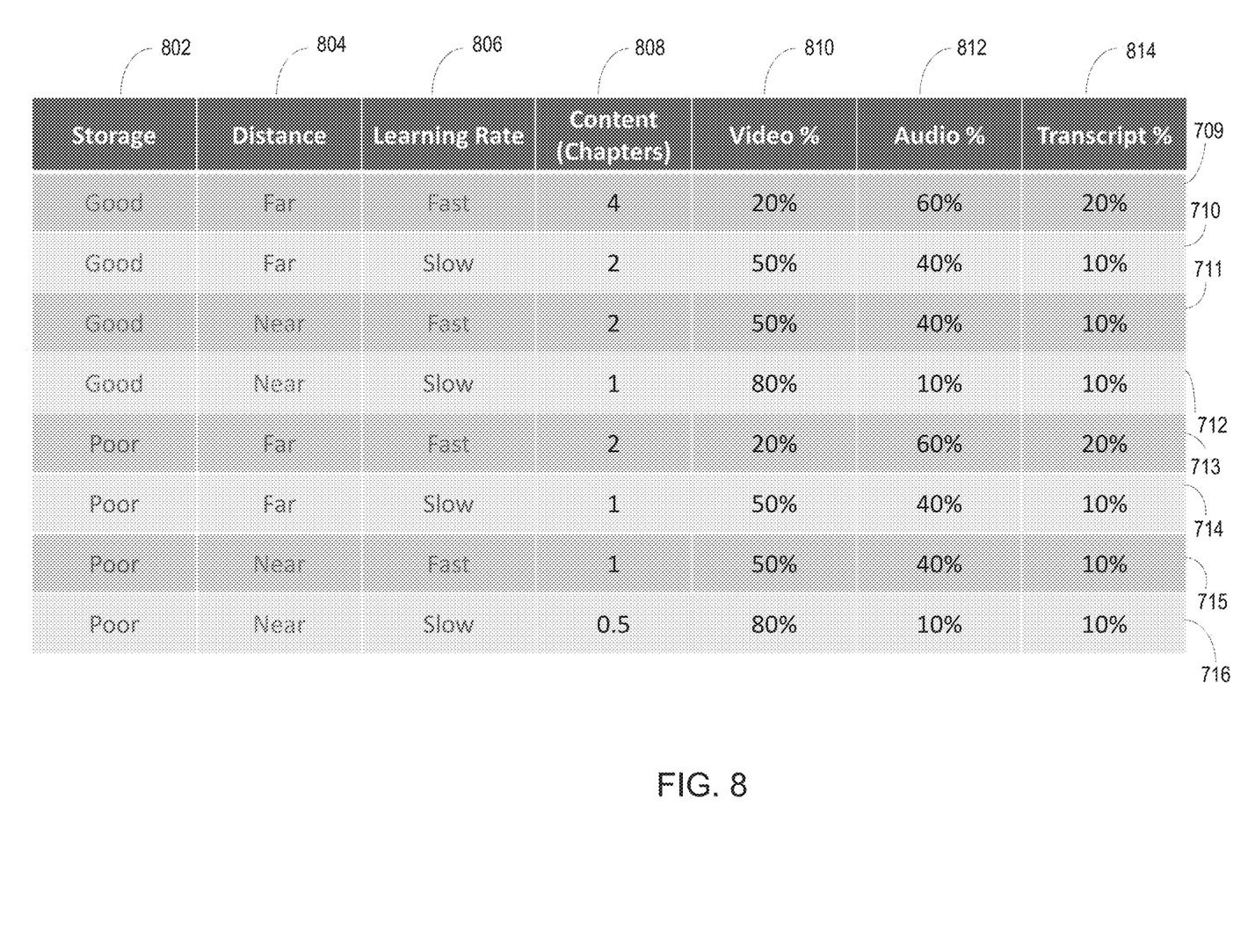
FIG. 8 illustrates a table of an example of the distribution of files/contents according to certain factors.

Based on the above steps, the learning system 100 may determine an amount of content, such as a volume of subject matter, and an allocation of the determined amount of content to the different types of slices to a selected user device 350. In that regard, FIG. 8 is a table illustrating an example of slice type allocations according to the factors discussed for each of a number of different users/user devices 350. In FIG. 8, each row of the illustrated table may refer to a respective user device 350. A storage characterization 802 is classification of whether the first predetermined threshold has been met, a distance descriptor 804 describes the travel distance of the user from the user's home base to the hub circuitry 112. A learning rate 806 characterizes the aptitude of the user, and therefore the granularity of the content needed by the user to be successful. A content amount 808 may be representative of the volume of subject matter being provided to the user while they are in communication with the hub circuitry 112. In the example of FIG. 8, the education modules are divided into chapters, and the amount of contents may represent the subject matter of chapters of educational materials being provided, which may be described in terms of a factor above, below or at an average allocation of subject matter. In other examples, other forms of allocation of a representative quantity (or volume) of subject matter may be provided.

The percentage of slices of content/datafiles which are determined by the learning system 100 to be provided as video slices (312A or 312B, for example) is provided as a video percentage 810. The percentage of slices content/datafiles which are determined by the learning system 100 to be provided as audio slices (312C for example) is provided as an audio percentage 812. The percentage of slices content/datafiles which are determined by the learning system 100 to be provided as transcript slices (312D for example) is provided as a transcript percentage 814. The percentage allocation of the types of raw slices 306 may be based on factor analysis at the user group level in communication with hub circuitry 112. In addition, or alternatively, the percentage allocation of the types of slices may be based on factor analysis at the individual level based on factor analysis at the individual user and user device 350 level.

Referring to FIGS. 7 and 8, at Step 709: if the answer to Step 704 is yes, then the slice dispenser 108 may determine that the storage capacity is good, the travel distance is far, the learning capacity is fast. As a result, the slice dispenser 108 may provide an amount of content representing 4 times the average content/files to the user, which, for example, may be allocated into different types of files as 20% video files, 60% audio files, and 20% transcript/text files as illustrated in FIG. 8.

Step 710: if the answer to Step 704 is no, then the slice dispenser 108 may determine that the storage capacity is good, the travel distance is far, the learning capacity is slow. As a result, the slice dispenser 108 may provide an amount of content representing 2 times the average content/files to the user, which, for example, may be allocated into different types of files as 50% video files, 40% audio files, and 10% transcript/text files as illustrated in FIG. 8.

Step 711: if the answer to Step 705 is yes, then the slice dispenser 108 may determine that the storage capacity is good, the travel distance is near, the learning capacity is fast. As a result, the slice dispenser 108 may provide an amount of content representative of 2 times the average content/files to the user, which, for example, may be allocated into different types of files as 50% video files, 40% audio files, and 10% transcript/text files. Comparing the allocation of Step 709 to Step 711 it should be noted that only twice the content was provided for Step 711 since the user could more easily return to the hub circuitry 112, while a higher percentage was provided as video due to the storage capacity of the user device 350.

Step 712: if the answer to Step 705 is no, then the slice dispenser 108 may determine that the storage capacity is good, the travel distance is near, the learning capacity is slow. As a result, the slice dispenser 108 may provide an amount of content representative of 1 times the average content/files to the user, which, for example, may be allocated into different types of files as 80% video files, 10% audio files, and 10% transcript/text files. Since in the example of Step 712, the user is identified as having a slow learning rate, and the user is relatively near the hub circuitry 112, a majority of the content is provided as video content, but only 1 times the average content/files to the user due to the size of the audio content and the user's relatively close proximity to the hub circuitry 112.

Step 713: if the answer to Step 707 is yes, then the slice dispenser 108 may determine that the storage capacity is poor, the travel distance is far, the learning capacity is fast. As a result, the slice dispenser 108 may provide an amount of content representative of 2 times the average content/files to the user, which, for example, may be allocated into different types of files as 20% video files, 60% audio files, and 20% transcript/text files.

Step 714: if the answer to Step 707 is no, then the slice dispenser 108 may determine that the storage capacity is poor, the travel distance is far, the learning capacity is slow. As a result, the slice dispenser 108 may provide an amount of content representative of 1 times the average content/files to the user, which, for example, may be allocated into different types of files as 50% video files, 40% audio files, and 10% transcript/text files.

Step 715: if the answer to Step 708 is yes, then the slice dispenser 108 may determine that the storage capacity is poor, the travel distance is near, the learning capacity is fast. As a result, the slice dispenser 108 may provide an amount of content representative of 1 time the average content/files to the user, which, for example, may be allocated into different types of files as 50% video files, 40% audio files, and 10% transcript/text files.

Step 716: if the answer to Step 708 is no, then the slice dispenser 108 may determine that the storage capacity is poor, the travel distance is near, the learning capacity is slow. As a result, the slice dispenser 108 may provide an amount of content representative of 0.5 times the average content/files to the user, which, for example, may be allocated into different types of files as 80% video files, 10% audio files, and 10% transcript/text files.

The example percentages of amounts of video/audio/transcript/text files discussed above are provided for the purpose of explanation. The amount of content, and the allocation percentages of to the represented content may be modified in other examples. In addition, as discussed elsewhere, an amount of hybridized content may be provided, which may include, for example, video and transcripts.

The description herein is merely exemplary in nature and, thus, variations that do not depart from the substance of the disclosure are intended to be within the scope of the disclosure. Such variations are not to be regarded as a departure from the spirit and scope of the disclosure.

The methods, devices, processing, circuitry, and logic described may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A learning system comprising:
non-transitory memory storing instructions executable to transmit a file to a user device of a user;
a hub circuitry; and
a processor circuitry configured to execute the instructions to:
initiate wireless communication between the user device and the hub circuitry in response to the user device entering a communication range of the hub circuitry;
retrieve information comprising a home base location of the user;
calculate a travel distance from the home base location of the user to entry of the user device into communication range of the hub circuitry;
determine a type of the file and an amount of content of the file based on a storage capacity of the user device, the travel distance, and a learning capacity of the user; and
transmit from the hub circuitry, to the user device, the file according to the type of the file and the amount of content of the file.

2. The learning system of claim 1,
wherein the type of the file is a video file, an audio file, a text file or a combination thereof, and the amount of content is a volume of subject represented by the file.

3. The learning system of claim 1, wherein, when the information is received, the processor circuitry is configured to:
determine a predetermined slice size for the user according to the storage capacity of the user device, the travel distance from the home base location of the user, and the learning capacity of the user.

4. The learning system of claim 3, wherein the processor circuitry is further configured to:
divide the information into a first slice;
determine whether the first slice is greater than or equal to the predetermined slice size;
in response to determination that the first slice is greater than or equal to the predetermined slice size, divide the first slice into a second slice, wherein the second slice includes a number of slices greater than the first slice; and
convert the second slice into a combination of a video file, an audio file, and a text file.

5. The learning system of claim 4, wherein the processor circuitry is further configured to:
in response to determination, by the processor circuitry that the first slice is less than the predetermined slice size, use the first slice to determine the type of the file and the amount of content of the file.

6. The learning system of claim 1, wherein the processor circuitry is further configured to:
extract, from at least one of the user device or a database storing user information, a home base location of the user;
determine whether the travel distance is greater than or equal to a predetermined value that is specific to each user;
when it is determined that the travel distance is greater than or equal to the predetermined value, recalculate the travel distance and transmit, the recalculated travel distance to a storage individually assigned to each user;
determine the type of the file and the amount of content of the file based on the recalculated travel distance; and
transmit, to the user device, the file according to the type of the file and the amount of content of the file.

7. The learning system of claim 6, wherein the processor circuitry is further configured to:
when it is determined that the travel distance is less than the predetermined value, transmit, to the user device, the file according to the type of the file and the amount of content of the file.

8. The learning system of claim 2, wherein, when the type of the file and the amount of content of the file are determined, the processor circuitry is configured to:
determine whether the storage capacity is greater than or equal to a first threshold value;
when it is determined that the storage capacity is greater than or equal to the first threshold value, transmit, to the user device, a first file; and
when it is determined that the storage capacity is less than the first threshold value, transmit, to the user device, a second file, wherein a size of the first file is greater than a size of the second file.

9. The learning system of claim 8, wherein, when the type of the file and the amount of content of the file are determined, the processor circuitry is further configured to:
determine whether the travel distance is greater than or equal to a second threshold value;
when it is determined that the travel distance is greater than or equal to the second threshold value, transmit, to the user device, a third file; and
when it is determined that the travel distance is less than the second threshold value, transmit, to the user device, a fourth file, wherein a size of the third file is greater than a size of the fourth file.

10. The learning system of claim 9, wherein, when the type of the file and the amount of content of the file are determined, the processor circuitry is further configured to:
determine whether the learning capacity is greater than or equal to a third threshold value;
when it is determined that the learning capacity is greater than or equal to the third threshold value, transmit, to the user device, a fifth file; and
when it is determined that the travel distance is less than the third threshold value, transmit, to the user device, a sixth file, wherein a size of the fifth file is greater than a size of the sixth file.

11. A computer-implemented method performed by a processor circuitry configured to execute instructions to transmit a file to a user device, the instructions stored in non-transitory memory, the method comprising:
determining a home base location of a user from at least one of a database storing user information of the user or the user device of the user;
calculating a travel distance from the home base location of the user to a hub circuitry of a learning system;
determining a type of the file and an amount of content of the file based on the travel distance, a storage capacity of the user device, and a learning capacity of the user; and
transmitting, to the user device, the file according to the type of the file and the amount of content of the file.

12. The method of claim 11, wherein determining the type of the file and the amount of content of the file comprises:
determining a predetermined slice size for the file according to the storage capacity of the user device, the travel distance from the home base location of the user to the hub circuitry, and the learning capacity of the user.

13. The method of claim 12 further comprising:
dividing the file into a first slice;
determining whether the first slice is greater than or equal to the predetermined slice size;
when it is determined that the first slice is greater than or equal to the predetermined slice size, dividing the first slice into a second slice, wherein the second slice includes a number of slices greater than the first slice, each being equal to or less than the predetermined slice size; and
converting the second slice into a combination of a video file, an audio file, and a text file.

14. The method of claim 13 further comprising:
when it is determined that the first slice is less than the predetermined slice size, using the first slice to determine the type of the file and the amount of content of the file.

15. The method of claim 11 further comprising:
determining whether the travel distance is greater than or equal to a predetermined value that is specific to each user;
when it is determined that the travel distance is greater than or equal to the predetermined value, recalculating the travel distance and transmitting, to an individual storage assigned to each user, the recalculated travel distance;
determining the type of the file and the amount of content of the file based on the recalculated travel distance, wherein the type of the file is one of a video file, an audio file, a text file, or some combination, and the amount of content is a volume of subject matter represented by the file; and
transmitting, to the user device, the file according to the type of the file and the amount of content of the file.

16. The method of claim 15 further comprising:
when it is determined that the travel distance is less than the predetermined value, transmitting, to the user device, the file according to the type of the file and the amount of content of the file without recalculating the travel distance.

17. The method of claim 11, wherein determining the type of the file and the amount of content of the file comprises:
determining whether the storage capacity is greater than or equal to a first threshold value;
when it is determined that the storage capacity is greater than or equal to the first threshold value, transmitting, to the user device, a first file; and
when it is determined that the storage capacity is less than the first threshold value, transmitting, to the user device, a second file, wherein a data file size of the first file is greater than a data file size of the second file.

18. The method of claim 17, wherein determining the type of the file and the amount of content of the file comprises:
determining whether the travel distance is greater than or equal to a second threshold value;
when it is determined that the travel distance is greater than or equal to the second threshold value, transmitting, to the user device, a third file; and
when it is determined that the travel distance is less than the second threshold value, transmitting, to the user device, a fourth file, wherein a data file size of the third file is greater than a data file size of the fourth file.

19. The method of claim 18, wherein determining the type of the file and the amount of content of the file comprises:
determining whether the learning capacity is greater than or equal to a third threshold value;
when it is determined that the learning capacity is greater than or equal to the third threshold value, transmitting, to the user device, a fifth file; and
when it is determined that the learning capacity is less than the third threshold value, transmitting, to the user device, a sixth file, wherein a size of the fifth file is greater than a size of the sixth file.

* * * * *